United States Patent [19]

Anderson et al.

[11] 4,108,448
[45] Aug. 22, 1978

[54] PISTON RING ASSEMBLY

[75] Inventors: George J. Anderson, Hagerstown; Roscoe Lee Bell, Springport, both of Ind.

[73] Assignee: Dana Corporation, Toledo, Ohio

[21] Appl. No.: 736,676

[22] Filed: Oct. 28, 1976

[51] Int. Cl.² .............................................. F16J 9/02
[52] U.S. Cl. .................................................. 277/157
[58] Field of Search ......... 277/138, 139, 140, 157–164

[56] References Cited

U.S. PATENT DOCUMENTS

| 2,729,524 | 1/1956 | Prasse | 277/157 |
| 3,191,946 | 6/1965 | Hamm | 277/157 |
| 3,281,156 | 10/1966 | Mayhew et al. | 277/159 |

Primary Examiner—Robert I. Smith
Attorney, Agent, or Firm—Robert M. Leonardi; Robert E. Pollock

[57] ABSTRACT

Disclosed is a piston ring including a spacer-expander spring member. In a preferred embodiment the ring is of cast iron and includes two axially spaced cylinder wall contacting lands. At least one generally rectangular inwardly facing spring receiving recess is formed in the interior wall of the ring to receive the spring member which is formed from a flat strip of metal in a "U" configuration with the legs thereof facing outwardly, peferably aligned with the lands on the ring. A plurality of slots are provided in the spring member dividing the periphery into a plurality of feet. In a preferred embodiment the feet are radiused as seen in plan view to a radius less than the radius of the pocket in which they fit. This has been found to reduce wear in the spring receiving groove and to reduce the tendency of the ring and spring to become united which is detrimental to performance and is a common problem in rings of this general type.

12 Claims, 5 Drawing Figures

PISTON RING ASSEMBLY

BACKGROUND OF THE INVENTION

Piston rings have been used for some time with separate spring members as part thereof to provide outward urging of the sealing face of the ring against the wall of the cylinder in which it operates. A variety of configurations have been employed and all have a common problem which is generally referred to as "unitizing." As the term implies the ring and the spring member become united and consequently the spring loses a substantial portion of its ability to bias the ring. Typical examples of the prior art can be found in U.S. Pat. Nos. 2,729,524; 3,456,954 and 3,698,054.

It is an object of the present invention to provide a piston ring assembly comprising a ring and an expander spring member which exhibits superior performance in use and which has a substantially lower tendency to unitize than prior art devices.

SUMMARY OF THE INVENTION

The foregoing and other objects are achieved by a piston ring assembly including an outer piston ring with at least one generally rectangular spring receiving recess or groove on its interior. A spring member fits within the groove and serves to bias the ring outwardly. The spring member is generally U-shaped in cross section and the legs thereof are provided with a plurality of slits dividing them into multiple feet. The feet are radiused, as seen in plan view, to a radius less than that of the pocket in which they fit. In accordance with one aspect of this invention a method for suitably radiusing the feet on the spring member is provided.

Tests performed on ring assemblies of the present invention have demonstrated lower wear (i.e., a lower tendency to unitize) between the ring and spring member.

BRIEF DESCRIPTION OF THE DRAWINGS

While the specification concludes with claims particularly and distinctly describing the invention it is believed that the same will be better understood with reference to the following description of an exemplary and preferred embodiment in conjunction with the accompanying drawings in which:

DESCRIPTION OF THE PREFERRED EMBODIMENTS

Figure 3:
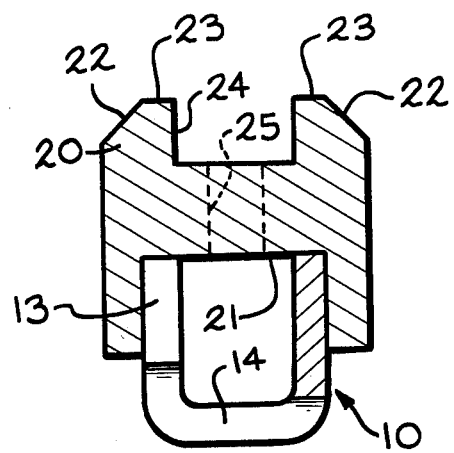
FIG. 3 is a cross section of the overall piston ring assembly of the present invention.

FIG. 3 of the drawings is a cross-sectional view of a preferred embodiment of the piston ring of the present invention. The assembly comprises a spring member designated generally as 10 which is U-shaped with the legs thereof fitting within a generally rectangular pocket 21 in ring 20. The ring 20 may be of any materials and geometry adapted for the particular application. In the illustrated and particularly preferred embodiment the ring 20 is chamfered at 22 on either side thereof. The chamfered sections terminate at the cylinder wall engaging face of the ring to form a pair of lands 23 separated by a chanel 24 centrally located on the diametrically exterior face of the ring. A plurality of circumferentially elongated slots 25 can be and preferably are spaced about the ring to provide an oil drainage path for oil which would otherwise be trapped between the sealing lands 23.

Preferably, and as illustrated, the lands 23 are on the order of 0.010 - 0.020 inches (0.25 - 0.51 mm) in width and are generally aligned with the legs of the spring member 10, thereby allowing the spring force to be transmitted along a single radial line to the lands 23. Cast iron is preferred for the ring 20 and the working face, particularly the lands 23 thereof are preferably chrome plated as known in the art.

Figure 1:
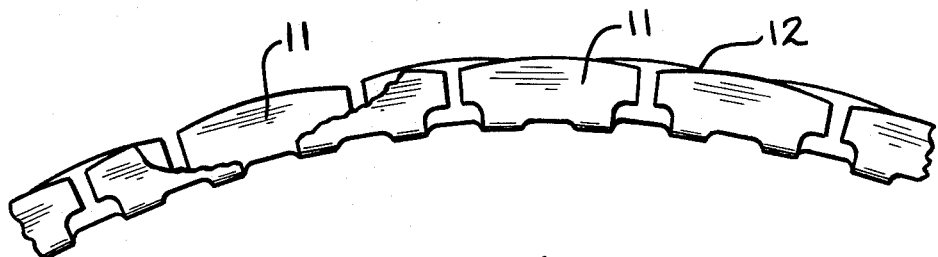
FIG. 1 is a partial plan view, cut away for clarity of the spring member of the present invention.

The spring member 10 is shown in plan view, partially cut away in FIG. 1. As can be seen therein the legs of the U are comprised of a plurality of individual feet 11 radiused on the outer face 12 thereof. Such radiusing provides reduced wear and a reduced tendency for the spring member 10 to unite with the ring 20. Preferably the radius of the edge 12 of the feet 11 is about 50 to about 80% of the in-use radius of the chanel 21 in the ring.

Figure 2:
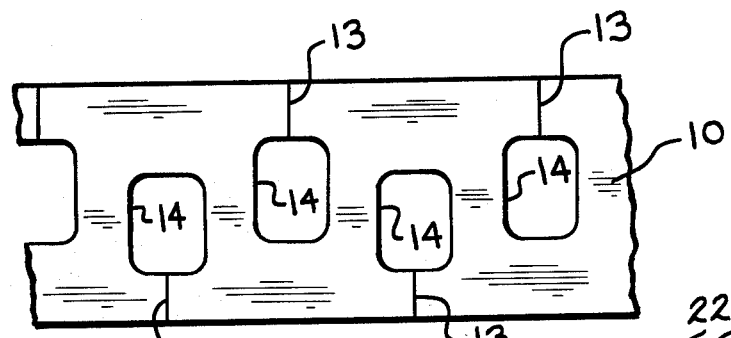
FIG. 2 is a plan view of the spring member of FIG. 2 at an intermediate stage in its manufacture.

FIG. 2 shows the spring member 10 is a partially formed state. Flat stock is used and for use with a cast iron ring 20 for example a 0.024 inch (0.61 mm) thick carbon steel stock 0.315 inch (8 mm) wide with a Rockwell 30N hardness of from about 65 to about 75 and particularly about 68 to 72 is preferred. A plurality of cuts 13 are made normal to the axis of the strip each extending inwardly from the edge of the strip to a punched aperture 14. The spacing between adjacent cuts 13 on the same side of the strip establishes the circumferential length of the feet 11 which is preferably from about 80 to about 120% of the width of the strip. Cuts 13 on opposite sides of the strip are evenly staggered to provide evenly staggered feet 11 on opposite sides of the spring member 10 as best seen in FIG. 1. Apertures 14 are preferably rectangular and about 30 to about 50% as wide as the strip and extend axially about 60 to 100% of their transverse extent. Alternate apertures are staggered laterally and centered on either side of the axis of strip with their centers offset therefrom by about 5 to 10% of the width of the strip.

The interior corners of the apertures are preferably defined by a radius approximately equal to the thickness of the stock. The strip is formed into its final U-shape by any suitable method such that the apertures extend from the cut 13 to the base of the U opposite therefrom as best seen in FIG. 3.

Figure 4:
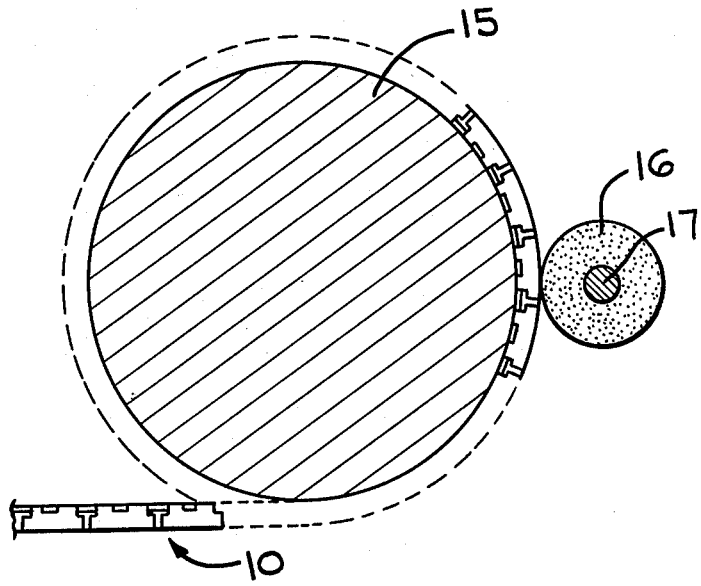
FIG. 4 is a diagramatic illustration of an apparatus and method for use in forming the spring member of FIG. 1.

After being formed into a U the stock is machined to provide the radiused edges 12 of the feet 11. An illustrative method of performing this operation is shown diagrammatically in FIG. 4. The spring member 10 is at this point a continuous and essentially endless strip. The strip is supported on a cylindrical member 15 which serves as a mandrel and rotates by suitable means (not shown) relative to a grinding wheel 16 which rotates on shaft 17. As is believed apparent, the radius formed on 12 is the radius of the mandrel 15 plus the "height" of the spring member 10 thereon. As was mentioned previously, the radius on 12 is preferably related to the radius of the ring 20 with which it is used.

Figure 5:
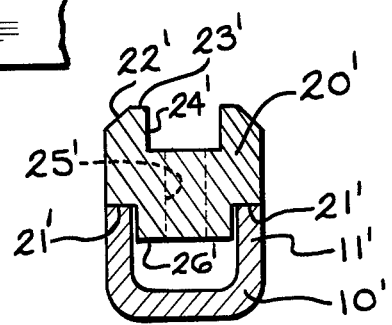
FIG. 5 is a cross section of an alternate embodiment of the present invention.

An alternate embodiment of the invention is shown in FIG. 5 and is preferred in applications requiring a narrow oil ring. In this embodiment a spacer-expander member 10' is provided which may be identical to that described above. The ring 20' is generally similar to that described above and includes chamfers 22', lands 23', chanel 24' and slots 25'. It is narrower, however, and includes two recesses or grooves 21' spaced by and on either side of a radially inner land 26. Again the lands 23' are generally aligned with the feet 11' of the spacer-expander member for the reasons described above.

Rings according to the present invention have been tested and found to be superior to similar rings of conventional design. In particular they provide an advantage in the substantially reduced wear between the ring 20 and spring member 10. This in turn means that a ring assembly according to the present invention has a longer life before its effectiveness is reduced by unitizing. Many modifications will be apparent to those skilled in the art and the foregoing description of the preferred embodiment is illustrative and not limiting.

What is claimed is:

1. A piston ring assembly comprising an outer annular ring including an outer face adapted to slidingly and sealingly engage the wall of a cylinder, said outer ring defining at least one spring receiving recess, said recess comprising a generally annular surface having a predetermined radius, and an annular expansion spring of generally U-shaped cross section having at least one leg extending within said at least one recess and extending outwardly toward said outer face of said outer ring, said at least one leg having a plurality of feet, each of said feet having a surface, at least a portion of said surface of each of said feet being in contact with said annular surface of said recess, wherein said surfaces of said feet have a radius less than said predetermined radius of said recess surface.

2. The piston ring of claim 1 wherein the radius of said surfaces on said feet is from about 50 to about 80% of the radius of said recess surface.

3. The piston ring assembly of claim 2 wherein said feet are staggered on opposite sides of said U.

4. The piston ring assembly of claim 1 wherein said outer face of said outer ring includes two relatively narrow lands for contacting said cylinder wall and wherein the feet of said U shaped spring are aligned therewith.

5. The piston ring assembly of claim 4 wherein the radius of said surfaces on said feet is from about 50 to about 80% of the radius of said recess surface.

6. The piston ring assembly of claim 5 wherein said feet are staggered on opposite sides of said U.

7. The piston ring assembly of claim 1 wherein said recess comprises an axially centrally located groove in the radially inward face of said outer ring.

8. The piston ring assembly of claim 7 wherein said outer face of said outer ring includes two relatively narrow lands for contacting said cylinder wall and wherein the feet of said U shaped spring are aligned therewith.

9. The piston ring assembly of claim 8 wherein the radius of said surfaces on said feet is from about 50 to about 80% of the radius of said recess surface.

10. The piston ring assembly of claim 1 wherein said outer ring defines two axially spaced annular spring receiving recesses each accepting one leg of said expansion spring.

11. The piston ring of claim 10 wherein said outer face of said outer ring includes two relatively narrow lands for contacting said cylinder wall and wherein the feet of said U shaped spring are aligned therewith.

12. The piston ring of claim 11 wherein the radius of said surfaces on said feet is from about 50 to about 80% of the radius of said recess surface.

* * * * *